US012574454B2

(12) United States Patent
Nielsen et al.

(10) Patent No.:    US 12,574,454 B2
(45) Date of Patent:    Mar. 10, 2026

(54) CHANGING A MOBILE DEVICE FEATURE SET UPON DETECTING ATTACHMENT OF A CASE

(71) Applicant: Microsoft Technology Licensing, LLC, Redmond, WA (US)

(72) Inventors: Gregory Allen Nielsen, Kirkland, WA (US); Andrew Richard Raffman, Redmond, WA (US); Donghwi Kim, Kirkland, WA (US); Nathan Craig Sherman, Bellevue, WA (US); Jaejin Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 18/322,822

(22) Filed: May 24, 2023

(65) Prior Publication Data

US 2024/0396988 A1     Nov. 28, 2024

(51) Int. Cl.
| | |
|---|---|
| *H04M 1/72409* | (2021.01) |
| *G06F 1/16* | (2006.01) |
| *G06F 1/20* | (2006.01) |

(52) U.S. Cl.
CPC .... *H04M 1/724092* (2022.02); *G06F 1/1698* (2013.01); *G06F 1/206* (2013.01)

(58) Field of Classification Search
CPC .......... H04M 1/724092; H04M 1/7246; G06F 1/1698; G06F 1/206
See application file for complete search history.

(56) References Cited

U.S. PATENT DOCUMENTS

| | | | |
|---|---|---|---|
| 2012/0315845 A1* | 12/2012 | Buczek | H04M 1/72412 455/41.1 |
| 2015/0043156 A1 | 2/2015 | Jain et al. | |
| 2015/0095667 A1 | 4/2015 | Nielsen et al. | |

(Continued)

FOREIGN PATENT DOCUMENTS

| | | | | |
|---|---|---|---|---|
| EP | 2804326 A1 | 11/2014 | | |
| EP | 3030947 A1 | 6/2016 | | |
| EP | 3030947 B1 * | 4/2022 | | G06F 1/206 |

OTHER PUBLICATIONS

"Alps Alpine Magnetic Sensors—Angle Sensor", Retrieved from: https://tech.alpsalpine.com/e/products/faq/sensor_magnetic/magnetic_angle.html, Retrieved Date: Oct. 18, 2022, 4 Pages.

(Continued)

*Primary Examiner* — Christopher M Brandt
(74) *Attorney, Agent, or Firm* — Alleman Hall LLP

(57)    ABSTRACT

Examples are disclosed that relate to a mobile device configured to change a feature set in response to detecting that a case is attached to the mobile device. One example provides a method enacted on a mobile device. The method comprises operating the mobile device with a first feature set. The first feature set comprises one or more features enabled when a case is not attached to the mobile device. The method further comprises detecting that the case is attached to the mobile device and an identity of the case by using a magnetic sensor. The method further comprises operating the mobile device with a second feature set that is different from the first feature set in response to detecting that the case is attached to the mobile device. The second feature set is selected based upon the identity of the case.

20 Claims, 10 Drawing Sheets

(56) References Cited

U.S. PATENT DOCUMENTS

| 2016/0062423 | A1 | 3/2016 | Kim et al. |
| 2019/0033934 | A1 | 1/2019 | Myers et al. |
| 2020/0150717 | A1 | 5/2020 | Mehandjiysky et al. |
| 2021/0125554 | A1* | 4/2021 | Lee .......................... G06F 1/206 |

OTHER PUBLICATIONS

"TMAG5115 High-Speed, Low Jitter, Hall-Effect Latch", Retrieved from: https://www.ti.com/lit/ds/symlink/tmag5115.pdf?ts= 1677015856024&ref_url=https%253A%252F%252Fwww.ti.com% 252Fproduct%252FTMAG5115, Dec. 2022, pp. 1-28.
"MA736", Retrieved From: https://www.monolithicpower.com/en/ products/sensors/ma736.html, Retrieved Date: Oct. 18, 2022, 4 Pages.
International Search Report and Written Opinion received for PCT Application No. PCT/US2024/026908, Aug. 30, 2024, 15 pages.

* cited by examiner

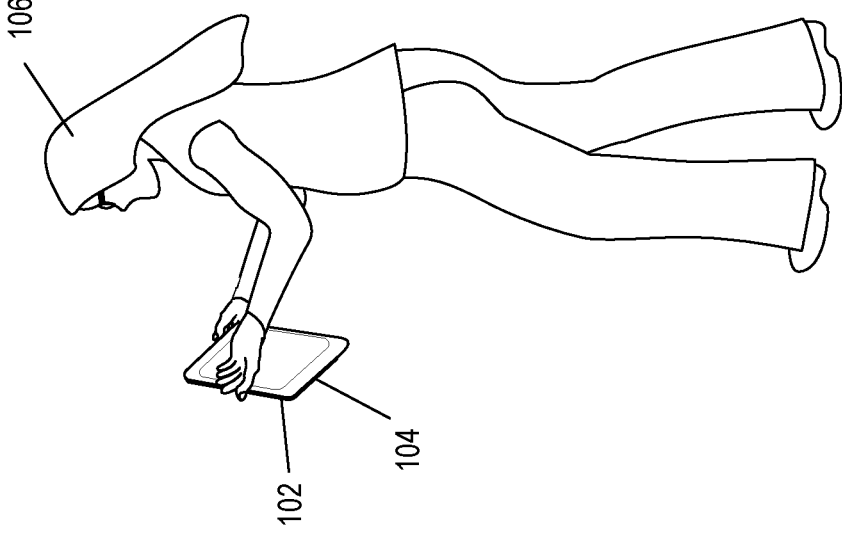
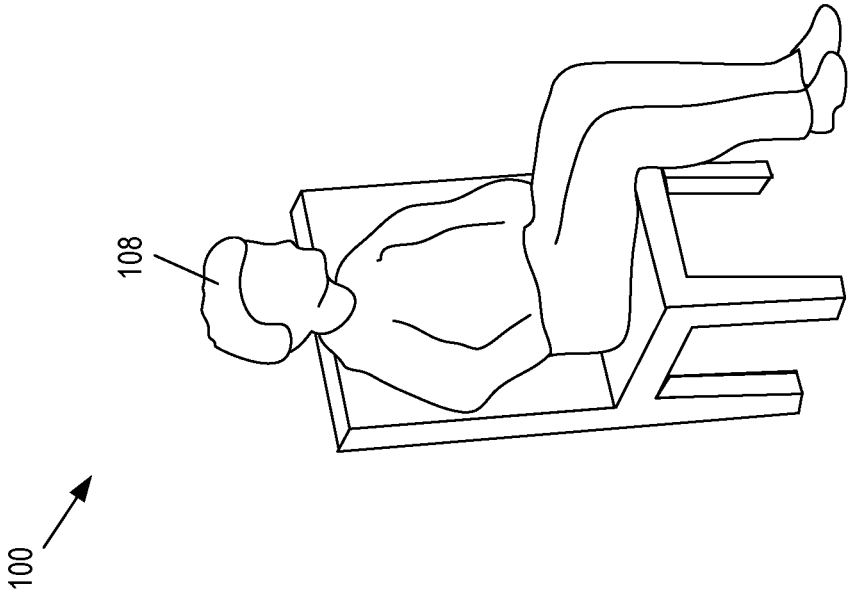
FIG. 1

MOBILE DEVICE 102

FRONT

BACK

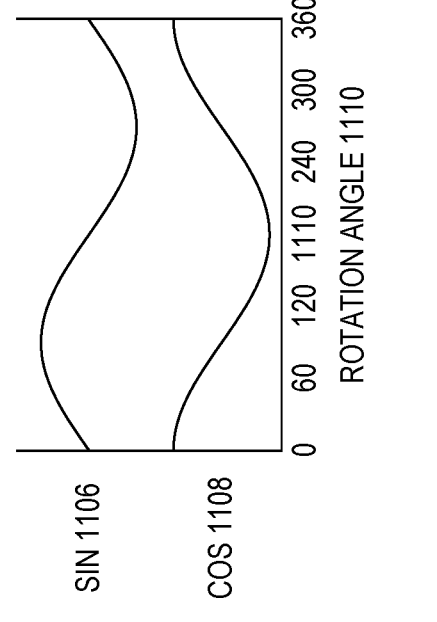
1100
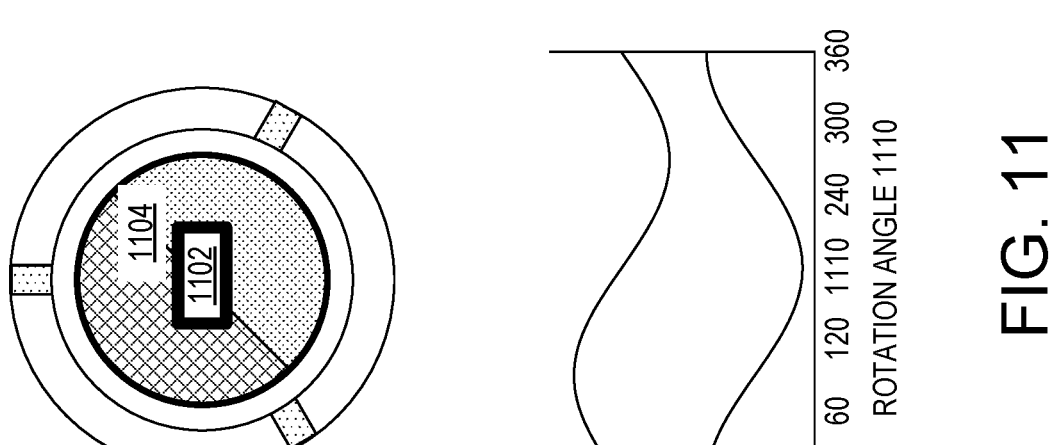
SIN 1106
COS 1108
ROTATION ANGLE 1110
FIG. 11
1000
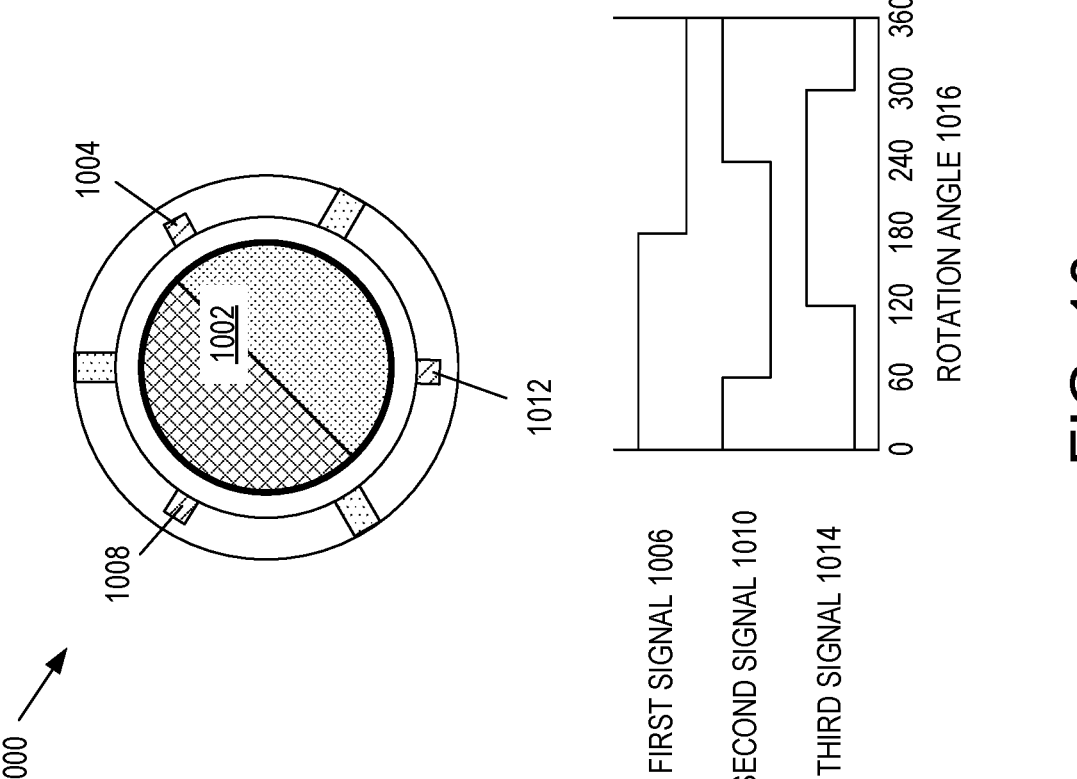
FIRST SIGNAL 1006
SECOND SIGNAL 1010
THIRD SIGNAL 1014
ROTATION ANGLE 1016
FIG. 10

Figure 12:
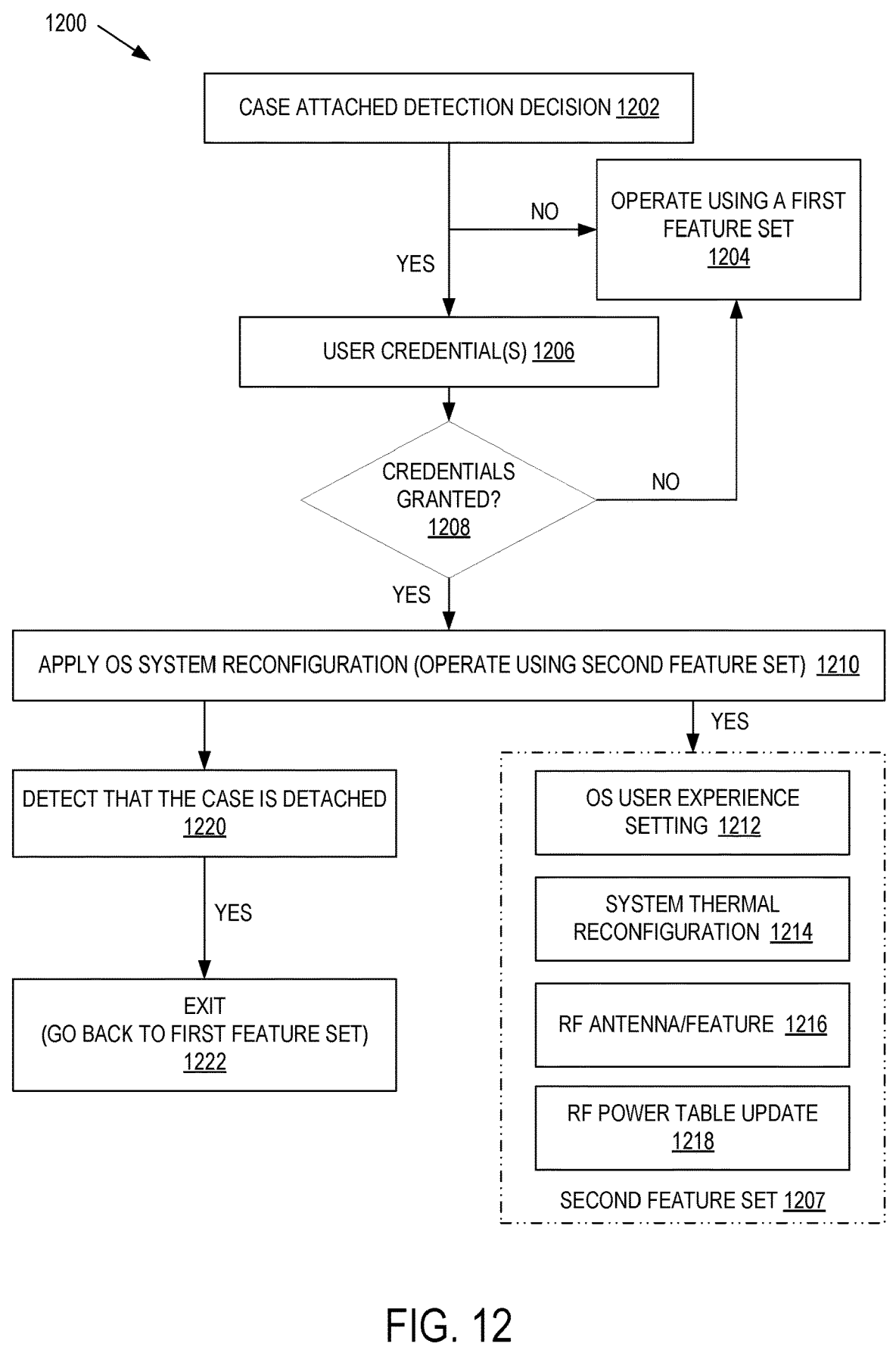

1200

CASE ATTACHED DETECTION DECISION 1202

NO → OPERATE USING A FIRST FEATURE SET 1204

YES

USER CREDENTIAL(S) 1206

CREDENTIALS GRANTED? 1208

NO

YES

APPLY OS SYSTEM RECONFIGURATION (OPERATE USING SECOND FEATURE SET) 1210

YES

DETECT THAT THE CASE IS DETACHED 1220

YES

EXIT (GO BACK TO FIRST FEATURE SET) 1222

OS USER EXPERIENCE SETTING 1212

SYSTEM THERMAL RECONFIGURATION 1214

RF ANTENNA/FEATURE 1216

RF POWER TABLE UPDATE 1218

SECOND FEATURE SET 1207

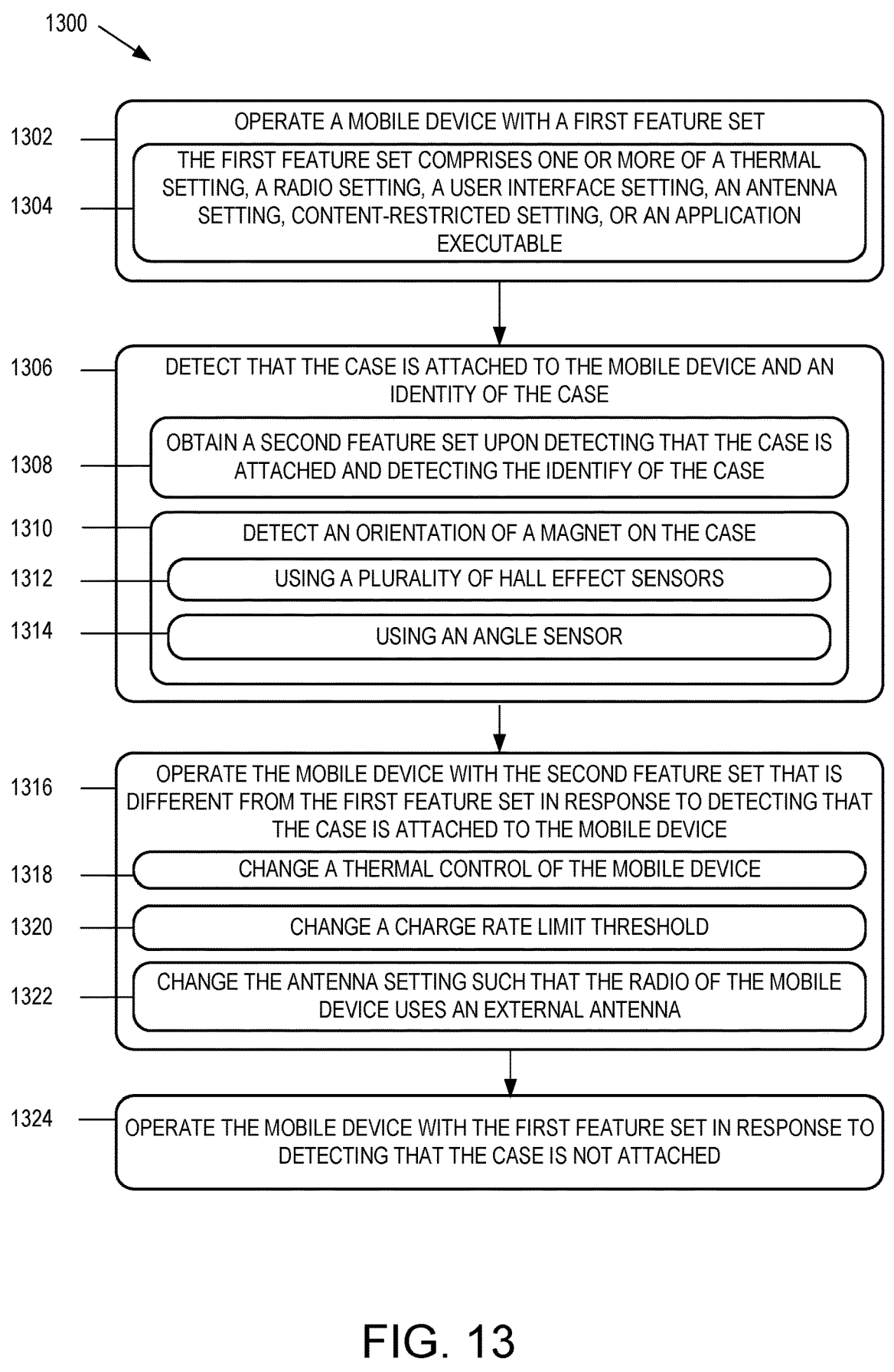

1302 — OPERATE A MOBILE DEVICE WITH A FIRST FEATURE SET

1304 — THE FIRST FEATURE SET COMPRISES ONE OR MORE OF A THERMAL SETTING, A RADIO SETTING, A USER INTERFACE SETTING, AN ANTENNA SETTING, CONTENT-RESTRICTED SETTING, OR AN APPLICATION EXECUTABLE

1306 — DETECT THAT THE CASE IS ATTACHED TO THE MOBILE DEVICE AND AN IDENTITY OF THE CASE

1308 — OBTAIN A SECOND FEATURE SET UPON DETECTING THAT THE CASE IS ATTACHED AND DETECTING THE IDENTIFY OF THE CASE

1310 — DETECT AN ORIENTATION OF A MAGNET ON THE CASE

1312 — USING A PLURALITY OF HALL EFFECT SENSORS

1314 — USING AN ANGLE SENSOR

1316 — OPERATE THE MOBILE DEVICE WITH THE SECOND FEATURE SET THAT IS DIFFERENT FROM THE FIRST FEATURE SET IN RESPONSE TO DETECTING THAT THE CASE IS ATTACHED TO THE MOBILE DEVICE

1318 — CHANGE A THERMAL CONTROL OF THE MOBILE DEVICE

1320 — CHANGE A CHARGE RATE LIMIT THRESHOLD

1322 — CHANGE THE ANTENNA SETTING SUCH THAT THE RADIO OF THE MOBILE DEVICE USES AN EXTERNAL ANTENNA

1324 — OPERATE THE MOBILE DEVICE WITH THE FIRST FEATURE SET IN RESPONSE TO DETECTING THAT THE CASE IS NOT ATTACHED

FIG. 13

CHANGING A MOBILE DEVICE FEATURE SET UPON DETECTING ATTACHMENT OF A CASE

BACKGROUND

A mobile device may be placed within a case for various use environments. For example, a mobile device may be deployed in a healthcare environment in which the mobile device can be exposed to sterilizing solutions and other possible contaminants. Thus, in such an environment, a case can be used for protection from such contaminants. As another example, a mobile device can be used in outdoors environments, such as at a work site. In such an environment, a case can be used to help protect the mobile device from weather and/or other environmental factors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to changing a mobile device feature set in response to detecting attachment of a case to the mobile device. One example provides a method enacted on a mobile device. The method comprises operating the mobile device with a first feature set. The first feature set comprises one or more features enabled when a case is not attached to the mobile device. The method further comprises detecting that the case is attached to the mobile device and an identity of the case by using a magnetic sensor. The method further comprises operating the mobile device with a second feature set that is different from the first feature set in response to detecting that the case is attached to the mobile device. The second feature set is selected based upon the identity of the case.

BRIEF DESCRIPTION OF THE DRAWINGS

FIG. 1 illustrates an example healthcare environment in which a mobile device is used with a case.

FIG. 10 schematically depicts an example magnetic sensor configuration utilizing Hall sensors.

FIG. 11 schematically depicts another example magnetic sensor configuration using an angle sensor.

FIG. 12 depicts a flow diagram of an example method for case detection and system reconfiguration.

FIG. 13 depicts a flow diagram of an example method for operating a mobile device utilizing case detection.

DETAILED DESCRIPTION

Figures 2A, 2B:
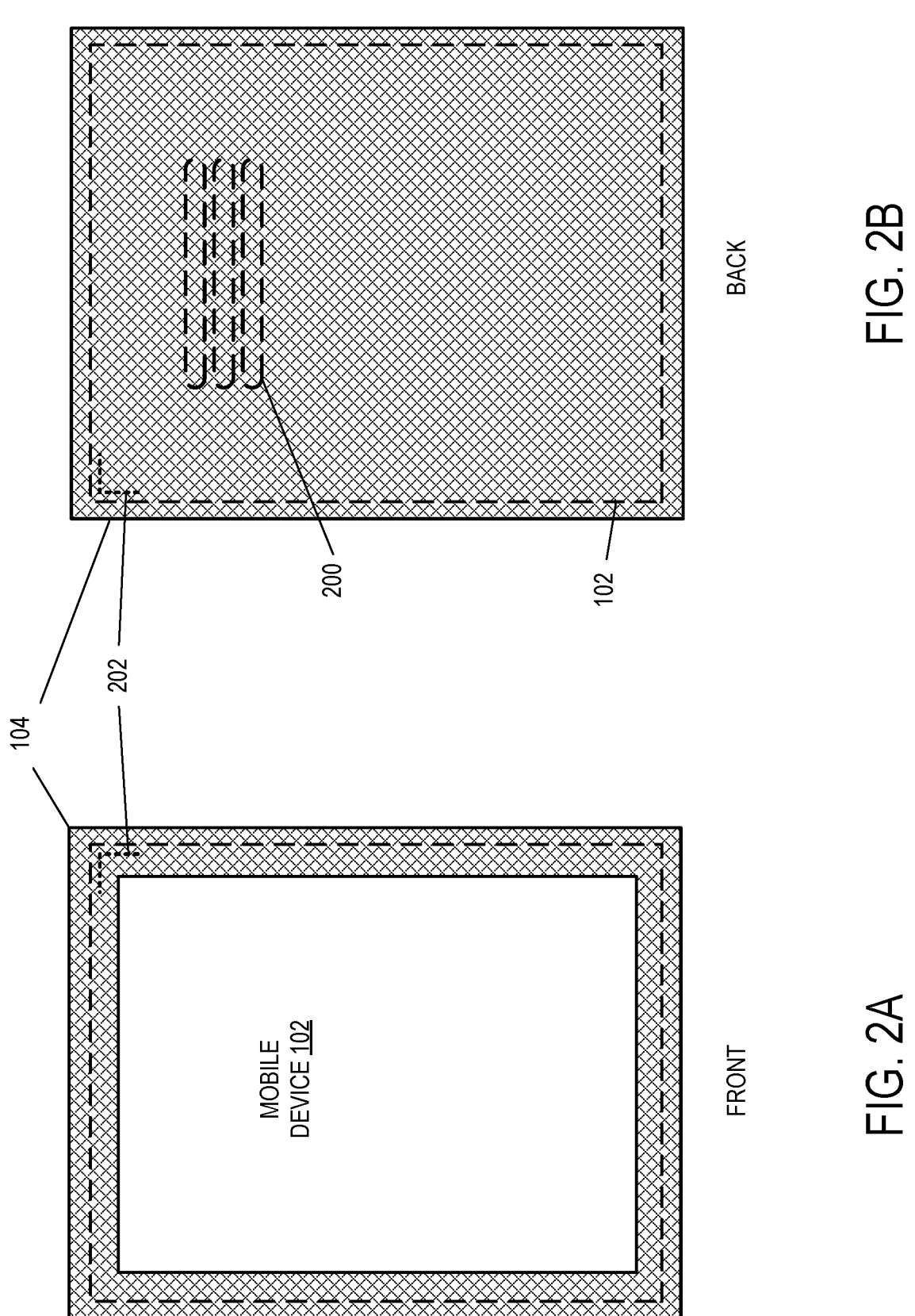
FIGS. 2A-2B schematically show a front and back view of the example mobile device and case of FIG. 1.

As previously mentioned, some mobile devices may be deployed with a corresponding case configured to operate in specified conditions of a use environment. However, some such cases may present various negative impacts on behaviors and/or performances of the mobile device. For example, some silicone cases used for added durability may change a user accessible surface and/or a thermal profile of the mobile device. Therefore, an external chassis temperature estimate used for run-time throttling of components in the mobile device may no longer be representative of the actual user accessible surface. Further, excessive throttling of the mobile device may occur, and/or the mobile device may unexpectantly shutdown under heavy loads. The changed thermal profile may further result in an internal fan of the mobile device running constantly and/or increasing an external temperature of the mobile device.

As another potential issue, some mobile devices may adjust a transmit power of an internal antenna to comply with government regulations, such as specific absorption rate (SAR) levels. More specifically, such mobile devices may reduce the transmit power of the internal antenna in response to detecting that a hand of a user is on or near the internal antenna and/or that the mobile device is being carried around. However, a case may trigger a SAR sensor on the mobile device and may result in reducing the transmit power in response. When the case is attached to the mobile device, the case may further reduce the signal strength from the internal antenna at the user accessible surface. One possible solution is to reconfigure the mobile device for the desired case to mitigate such issues. However, current reconfiguration procedures can be inconvenient to implement.

Accordingly, examples are disclosed that relate to changing a feature set of a mobile device in response to detecting that a case is attached to the mobile device. Briefly, a mobile device comprises a magnetic sensor and a storage device comprising instructions operable by a logic device to implement a first feature set on the mobile device. The instructions are further operable to detect that a case is attached to the mobile device and also an identity of the case using the magnetic sensor. The instructions are further operable to change from the first feature set to a second feature set in response to detecting that the case is attached. The second feature set is different that the first feature set. In some examples, the mobile device is configured to select a second feature set based on the identity of the case. In such a manner, different features may be enabled and/or disabled based on different case configurations for different use environments, such as such as for use by sports teams, in healthcare environments, in kiosk environments, or retail environments, for example.

Before discussing these examples in more detail, FIG. 1 schematically depicts an example use environment 100. Use environment 100 can represent a healthcare environment, for example. Use environment 100 comprises a first user 106 holding mobile device 102 and communicating with a second user 108. Case 104 is attached to mobile device 102. In a healthcare environment, case 104 can be configured to help protect mobile device 102 from foreign matter, moisture, and/or sterilizing solutions. In other examples, case 104 can be configured to protect mobile device 102 from physical damage, such as from an impact, for example. In further examples, a case can be a fixed installation, such as at a kiosk. Such configurations can facilitate deployment of a mobile device in various use environments, such as in retail environments, outdoor work sites, sports environments, and/or healthcare environments, for example.

Case 104 may impact behaviors and/or performances of mobile device 102 when attached to mobile device 102. FIGS. 2A and 2B schematically depict a front and back view, respectively, of mobile device 102 and case 104. Mobile device comprises ventilation holes 200. As can be seen, case 104 blocks ventilation holes 200, which may result in an internal fan of mobile device 102 running constantly and/or increasing external temperature of mobile device 102. Thus, mobile device 102 is configured to change from a first feature set to a second feature set in response to detecting that case 104 is attached to mobile device 102, as described in more detail below. Here, the second feature set comprises one or more settings that mitigate impacts of the case on thermal control. Such settings can include settings that reduce heat production by mobile device 102 and/or increase a rate of heat transfer out of mobile device 102. As a more specific example, reducing the heat produced by mobile device 102 can include reducing a runtime of the internal fans and/or lowering a processing speed of mobile device 102. As another example, reducing power usage of mobile device 102 reduces the heat produced by mobile device 102, such as reducing screen brightness and/or reducing an operational frequency and/or voltage of a processor on mobile device 102. Other examples are discussed below. While ventilation holes 200 are depicted on the back of mobile device 102, in other examples, ventilation holes 200 may be located at an edge of mobile device 102 or another location.

Mobile device 102 further comprises an internal antenna 202. As previously mentioned, mobile device 102 may reduce a transmit power of internal antenna 202 in response to detecting that a hand of user 106 is near internal antenna 202. As can be seen, case 104 covers internal antenna 202 and may further attenuate a signal strength at a user accessible surface. More specifically, a material of case 104 may absorb some of the radio waves from internal antenna 202. Further, case 104 may increase a distance between the user accessible surface and internal antenna 202. Signal strength decreases relative to an inverse square of a distance from an antenna. Therefore, the signal strength from internal antenna 202 at the user accessible surface of case 104 may be lower than a signal strength at a user accessible surface of mobile device 102 without case 104. Further, case 104 may change an absorption profile of mobile device 102 by absorbing some of the radio waves from internal antenna 202, and/or by increasing a distance between the user accessible surface and internal antenna 202. In view of the above, mobile device 102 is configured to not reduce the transmit power of internal antenna 202 in response detecting that case 104 is attached. In some examples, mobile device 102 can be configured to increase the transmit power of internal antenna 202 in response to detecting that case 104 is attached to mobile device 102. Such a configuration can help to offset the change of the absorption profile resulting from case 104. FIGS. 2A and 2B are illustrative. In other examples, mobile device 102 and/or case 104 may have different configurations than those shown.

Figure 3:
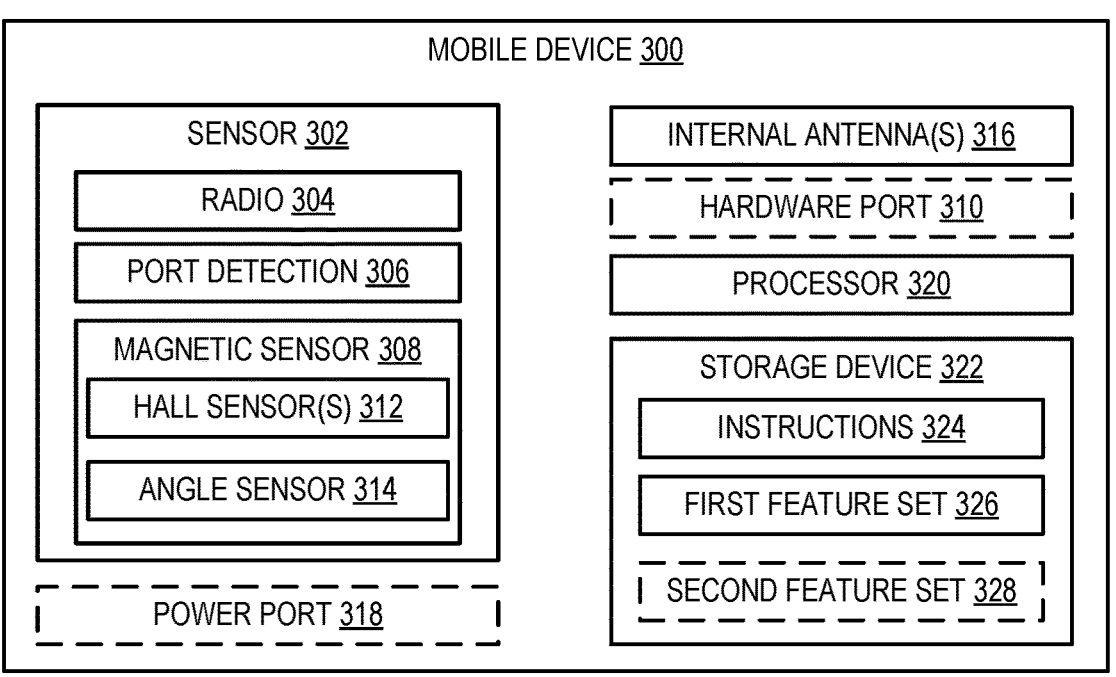
FIG. 3 shows a block diagram of an example mobile device.

FIG. 3 depicts a block diagram of an example mobile device 300. Mobile device 102 is an example of mobile device 300. Mobile device can comprise one or more of a mobile phone, a tablet, a laptop, or another suitable mobile device to which a case can be attached. An example case is discussed with reference to FIG. 4. Mobile device 300 comprises a sensor 302 configured to output a signal indicative that the case is attached to mobile device 300. Sensor 302 is further configured to detect an identity of the case. Sensor 302 comprises a magnetic sensor 308. Sensor 302 alternatively or additionally can further comprise one or more of a radio 304 or a port detection sensor 306, as examples.

Radio 304 can comprise a Bluetooth radio, a radiofrequency (RF) radio, near-field communication (NFC) radio, ultra-wideband (UWB) radio, or another wireless radio. In some examples, radio 304 can be configured to detect a radio tag of the case, such as RF identification (RFID) tag, for example. Port detection sensor 306, when included, is configured to output a signal indicative that the case is attached to an optional hardware port 310 of mobile device 300, such as a magnetic power supply port, a serial port, a USB (universal serial bus) port, a keyboard interface, or another hardware port, for example. Magnetic sensor 308 can comprise one or more Hall sensors 312, an angle sensor 314, or combinations thereof. Hall sensors 312 may not utilize polling a hardware interface (e.g., serial peripheral interface (SPI) or inter-integrated circuit (I2C)) or wirelessly, and thus may have a lower complexity and/or power than radio 304 or port detection sensor 306. Example magnetic sensors are discussed in more detail with reference to FIGS. 10 and 11. In other examples, sensor 302 can comprise another suitable sensor for detecting that the case is attached to mobile device 300 and/or detecting the identity of the case.

Mobile device 300 further comprises one or more internal antennas 316. Some of the internal antennas 316 can be used with radio 304. Additionally or alternatively, some of the internal antennas 316 can be configured to communicate with another device, such as using Bluetooth, wireless fidelity (WiFi), cellular, global positioning system (GPS) network, or another wireless communication. Mobile device 300 can optionally comprise a power port 318 configured to provide power to the case.

Mobile device 300 further comprises a processor 320 and a storage device 322 comprising instructions 324 operable by processor 320. Instructions 324 can be configured to perform any method disclosed herein. For example, processor 320 can execute instructions 324 to change from a first feature set 326 to a second feature set 328 in response to detecting that the case is attached to mobile device 300. Further, processor 320 can change from second feature set 328 to first feature set 326 in response to detecting that the case is detached from mobile device 300. Storage device 322 further comprises first feature set 326. First feature set 326 can be stored in firmware, a controller, a thermal/power management framework, a driver, and/or any combination thereof. In various examples, first feature set 326 can be pre-installed on mobile device 300, downloaded to mobile device 300, or any combination thereof. Further, first feature set 326 can be downloaded during a device update, scheduled for a desired time, and/or on demand from a cloud-computing system or other remote computing system.

As depicted, storage device 322 further includes second feature set 328. Similar to first feature set 326, second feature set 328 can be pre-installed and/or downloaded on mobile device 300. In some examples, second feature set 328 can comprise a baseline feature set stored in storage device 322, and then, at a later time, second feature set 328 can be updated. In such examples, second feature set 328 can be updated by downloading updated features from one or more of the case, the cloud-computing system, and/or another computing system. In some such examples, second feature set 328 can be updated by downloading the updated features in response to mobile device 300 detecting a problem, such as excessive thermal throttling for example.

In some examples, second feature set 328 can be selected from a plurality of available feature sets based on an identity of the case. In such a manner, mobile device 300 may automatically implement a feature set configured for a specific case model that is attached to the mobile device. An example second feature set is discussed in more detail with reference to FIG. 5B. Further aspects of processor 320 and storage device 322 are discussed with reference to FIG. 14. In other examples, one or more optional components depicted in FIG. 3 may be omitted.

Figure 4:
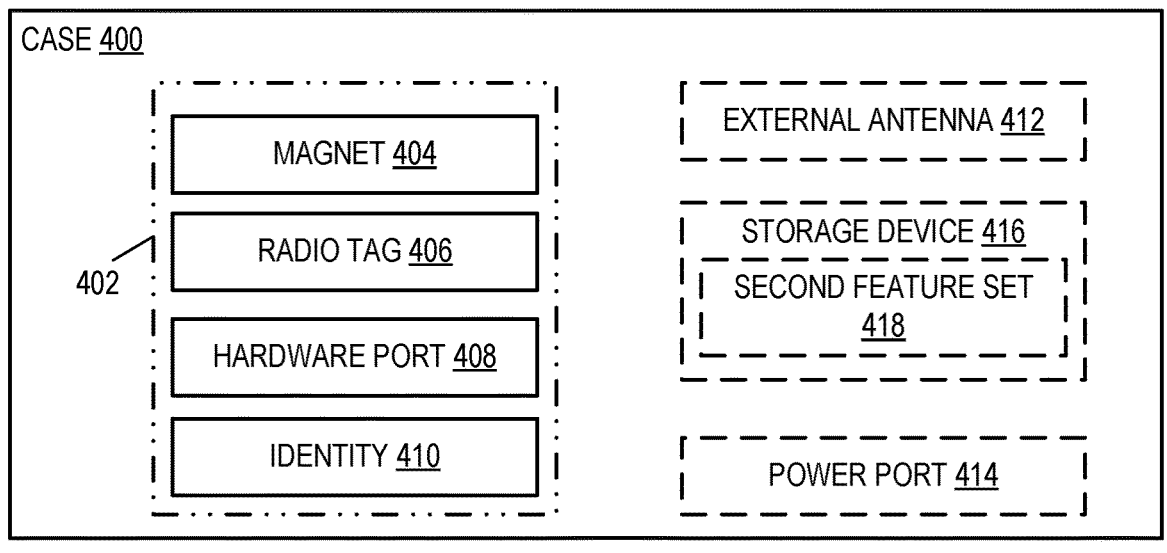
FIG. 4 shows a block diagram of an example case.

FIG. 4 depicts a block diagram of an example case 400 configured to attach to a mobile device, such as mobile device 300, for example. Case 104 is an example implementation of case 400. Case 400 comprises detectable hardware 402. Detectable hardware 402 is configured to indicate the presence of case 400 and is used by the mobile device to detect that case 400 is attached to the mobile device. Detectable hardware 402 comprises a magnet 404. In some examples, detectable hardware 402 can alternatively or additionally comprise one or more of a radio tag 406 or a hardware port 408. Radio tag 406 can include an RFID tag, an NFC tag, a Bluetooth tag, and/or another wireless tag.

Case 400 further comprises an optional hardware port 408. Hardware port 408, where present, is configured to connect to a corresponding hardware port of the mobile device. In some examples hardware port 408 can consume the corresponding hardware port of the mobile device. In other examples, hardware port 408 can be configured to extend the corresponding hardware port of the mobile device such that the corresponding hardware port of the mobile device is accessible to a user. In further examples, hardware port 408 can be configured as a hub, such as a USB hub. Such a configuration can help to keep the corresponding hardware port of the mobile device accessible to the user.

Detectable hardware 402 can further comprise an identity 410. Identity 410 indicates a model and/or type of case 400. The identity 410 can be used by a mobile device to select a feature set designed for that model of case. As a specific example, the model and/or type may pose potential ventilation hole blockages to the mobile device from case 400. As such, a mobile device may implement a corresponding feature set to change a thermal control of mobile device. Identity 410 can comprise other information relating to a configuration of case 400.

In some examples, magnet 404 can be configured to indicate the model and/or type of case 400. Thus, the magnet can indicate an identity of a type and/or model of the case. For example, an orientation of magnet 404 relative to a mobile device positioned in case 400 can indicate the identity of the case to the mobile device. Examples of utilizing an orientation of a magnet 404 are discussed in more detail with reference to FIGS. 9, 10, and 11.

Case 400 further comprises an optional external antenna 412. External antenna 412 is configured to be connectable to a transmitter of the mobile device when case 400 is attached to the mobile device. Examples of external antenna 412 are discussed in more detail with reference to FIGS. 6, 7, and 8. Case 400 further comprises an optional power port 414 configured to receive power from the mobile device. In other examples, external antenna 412 and/or power port 414 may be omitted.

Case 400 can further include optional storage device 416 comprising second feature set 418. Second feature set 418 comprises a set of features that help to configure the mobile device when case 400 is attached to the mobile device. In some examples, second feature set 418 can comprise a baseline set of features related to case 400. An example second feature set is discussed in more detail with reference to FIG. 5B. In other examples, storage device 416 may be omitted. In such examples, a mobile device can download and implement the second feature sent upon case 400 being attached to the mobile device. In other examples, case 400 may include a logic device and/or another component not shown.

Figures 5A, 5B:
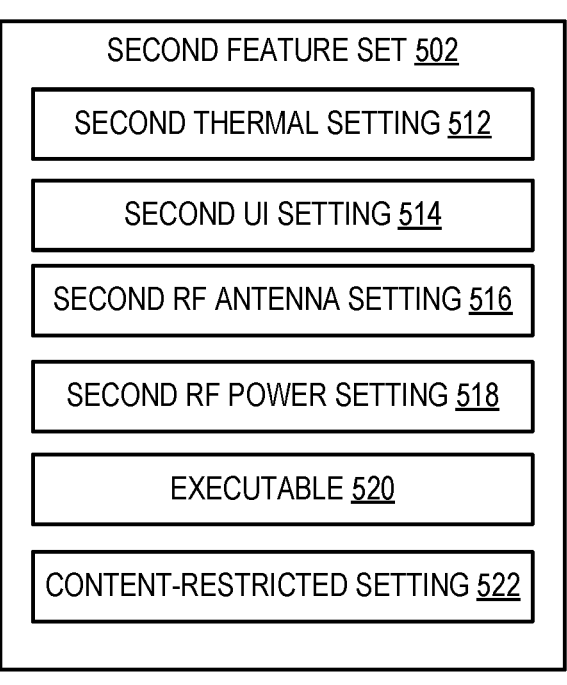
FIGS. 5A-5B show block diagrams of example feature sets.

As previously mentioned, a mobile device can select a first feature set or a second feature set in response to detecting whether a case is unattached to or attached to the mobile device. FIGS. 5A and 5B schematically depict examples of a first feature set 500 and a second feature set 502. Second feature set 502 is configured to be different from first feature set 500.

First feature set 500 of FIG. 5A comprises a first thermal setting 504. First thermal setting 504 can include one or more thermal thresholds (e.g., coefficients for temperature estimates of a user accessible surface of the mobile device, override VTS coefficients, thermometer icon threshold, a processor hot threshold, charging rate limiting thresholds, soft shutdown threshold, alert shutdown thresholds, fan profile overrides, fan control configuration override, thermal throttling trip point, core parking trip point, operating system hibernation trip point, operating system shutdown trip point, battery management disabling, display brightness scaling, boot time, shutdown, an exterior temperature of the mobile device, coefficient for a temperature estimate, a fan control profile, etc.) or another suitable thermal and/or power setting. The thermal thresholds may be used by one or more of thermal, battery, or power management systems.

First feature set 500 further comprises a first user interface (UI) setting 506. Examples include settings such as an operating system (OS) background color, and/or an OS background image. First feature set 500 further comprises a first RF antenna setting 508 and a first RF power setting 510 (e.g., radio transmit power). In other examples, one or more of first thermal setting 504, first UI setting 506, first RF antenna setting 508, or first RF power setting 510 may be omitted. In further examples, first feature set 500 can comprise another suitable setting, threshold, and/or feature. First feature set 500 can be stored on the mobile device as a default feature set.

Next, in FIG. 5B, similar to first feature set 500, second feature set 502 comprises a second thermal setting 512, a second UI setting 514, a second RF antenna setting 516, and a second RF power setting 518. In contrast, a value and/or another aspect of one or more of second thermal setting 512, second UI setting 514, second RF antenna setting 516, or second RF power setting 518 is different than a corresponding feature of first feature set 500. Second thermal setting 512 can comprise any suitable thermal and/or power setting relating to a change in a thermal/power profile of the mobile device resulting from the case being attached. In some examples, second thermal setting 512 can comprise a fan control profile that is reflective of the case blocking ventilation holes of the mobile device. In further examples, second thermal setting 512 can adjust a battery setting (e.g., using a thermal threshold of a battery charging rate limit threshold) and/or battery management protocol. Second thermal setting 512 can be configured to change a thermal control of the mobile device in second feature set 502 compared to in first feature set 500. Changing the thermal control can include reducing heat produced by the mobile device and/or increasing a rate of thermal transfer of the heat produced out of the mobile device.

Second UI setting 514 can comprise a display brightness setting and/or threshold that is different than first UI setting 506. In some examples, second UI setting 514 can comprise a logo and/or display color scheme associated with a brand of the case. Second RF antenna setting 516 can comprise a setting to use an external antenna of the case, as will be discussed in FIGS. 6, 7, and 8. Second RF power setting 518 can comprise a higher transmit power than first RF power setting 510. The higher transmit power may help to mitigate signal strength degradation resulting from the case covering an internal antenna of the mobile device.

Second feature set 502 further can comprise an executable 520. More specifically, in response to detecting that the case is attached to the mobile device, mobile device downloads and/or installs executable 520, such as a specific healthcare application associated with a specific healthcare case, for example. Second feature set 502 further can comprise an optional content-restricted setting 522, such as for use in a classroom or parental restrictions, for example.

As previously mentioned, second feature set 502 can be stored on the mobile device, on the case, in a cloud computing system, or combinations thereof. In some examples where second feature set 502 is stored on the device and/or on the case, second feature set 502 can comprise a baseline feature set for the case. In some such examples, second feature set 502 can be updated by downloading features from the cloud-computing system. In such examples, the features in the cloud-computing system can comprise the latest features associated with the case. In such a manner, second feature set 502 can be updated through software updates rather than changing hardware. Further, such configurations can help to enable the mobile device to use the second feature set 502 when mobile device is not connected to the cloud-computing system. Second feature set 502 may help to configure a user experience when the case is detected as attached to the mobile device. FIGS. 5A and 5B are illustrative. In other examples, another setting and/or feature may be used.

As previously mentioned, an RF antenna setting can comprise a switch configuration to select between an internal antenna on a mobile device and an external antenna on a case attached to the mobile device. The external antenna can be configured to be a more efficient antenna than the internal antenna. More specifically, the external antenna may have more space on the case than the internal antenna on the mobile device. Further, the external antenna is further away from digital noise in the mobile device, and therefore may experience less radio interference than the internal antenna which is closer to the digital noise. In some examples the external antenna can be embedded and/or otherwise integrated into the case. In such a manner, the external antenna may have better performance per watt than the internal antenna.

Figure 8:
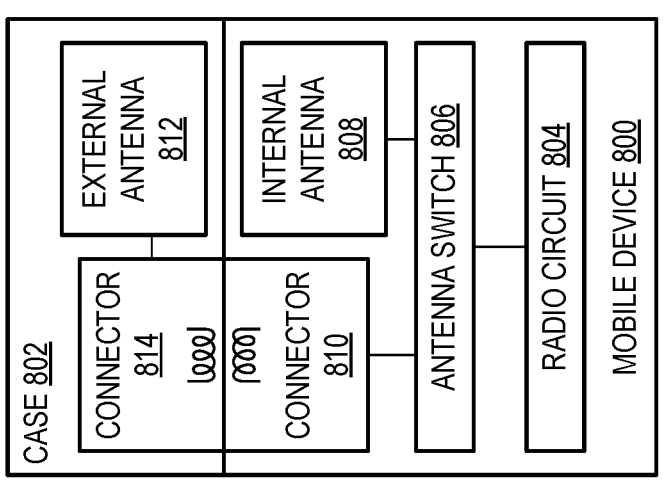
FIGS. 6, 7, and 8 depict block diagrams of examples radiofrequency (RF) antenna configurations of a mobile device and a case.
Figure 7:
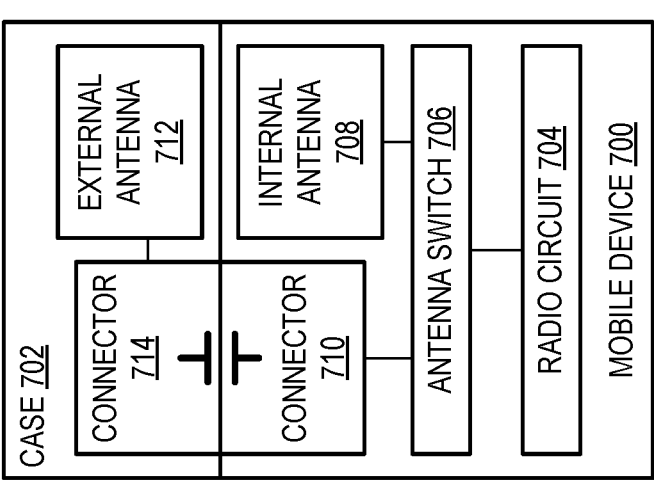
Figure 6:
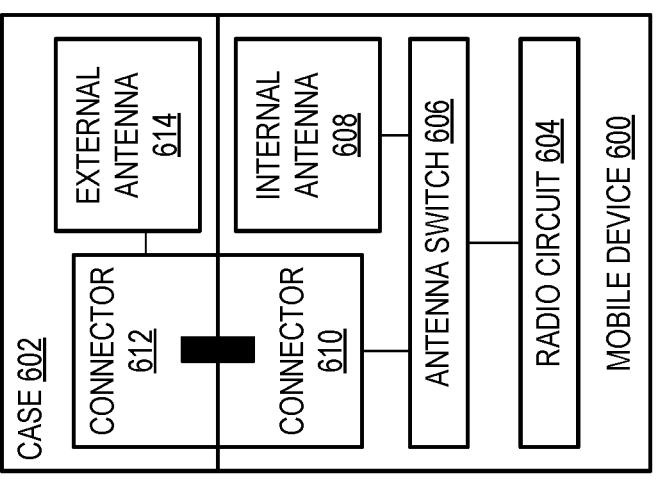

FIGS. 6, 7, and 8 schematically depict various antenna configurations for a mobile device and attached case. In FIG. 6, an antenna configuration of a mobile device 600 and a case 602 utilizes a wired connection. Mobile device 600 is an example of mobile device 300. Case 602 is an example of case 400. Mobile device 600 comprises a radio circuit 604 connected to an antenna switch 606. Antenna switch 606 is configured to connect radio circuit 604 to internal antenna 608 in a first setting. Antenna switch 606 is further configured to connect radio circuit 604 to a connector 610 in a second setting. The first setting is part of a first feature set. Similarly, the second setting is part of a second feature set.

Case 602 comprises a corresponding connector 612 configured to connect to connector 610. In the example of FIG. 6, connector 610 and connector 612 are connected using a wired connection, such as a pogo pin or leaf spring contact, for example. Connector 612 is also connected to an external antenna 614 of case 602. In such a manner, in response to detecting that case 602 is attached, mobile device 600 operates in the second setting where radio circuit 604 uses external antenna 614. As previously mentioned, external antenna 614 may have a higher performance per watt than internal antenna 608.

Alternatively, as shown in FIG. 7, an antenna configuration of a mobile device 700 and a case 702 can use a capacitive connection. Mobile device 700 is an example of mobile device 300. Case 702 is an example of case 400. Similar to mobile device 600, mobile device 700 comprises a radio circuit 704 connected to an antenna switch 706. Antenna switch 706 is configured to connect radio circuit 704 to an internal antenna 708 of mobile device in a first setting. Antenna switch 706 is further configured to connect radio circuit 704 to a connector 710 of mobile device 700 in a second setting. Similar to case 602, case 702 comprises an external antenna 712 connected to a connector 714. In contrast, connector 710 and connector 714 are configured to connect using a capacitive connection (depicted here as a capacitor). Next, in FIG. 8, an antenna configuration of a mobile device 800 and a case 802 can use an inductive connection. Mobile device 800 is an example of mobile device 300. Case 802 is an example of case 400. Similar to mobile device 600, mobile device 800 comprises a radio circuit 804 connected to an antenna switch 806. Antenna switch 806 is configured to connect radio circuit 804 to an internal antenna 808 of mobile device 800 in a first setting. Antenna switch 806 is further configured to connect radio circuit 804 to a connector 810 of mobile device 800 in a second setting. Similar to case 602, case 802 comprises an external antenna 812 connected to a connector 814. In contrast, connector 810 and connector 814 are configured to connect using an inductive connection (depicted here as a pair of inductors configured for mutual coupling). FIGS. 6, 7, and 8 are illustrative. In other examples, a plurality of internal antennas and/or external antennas may be used.

Figure 9:
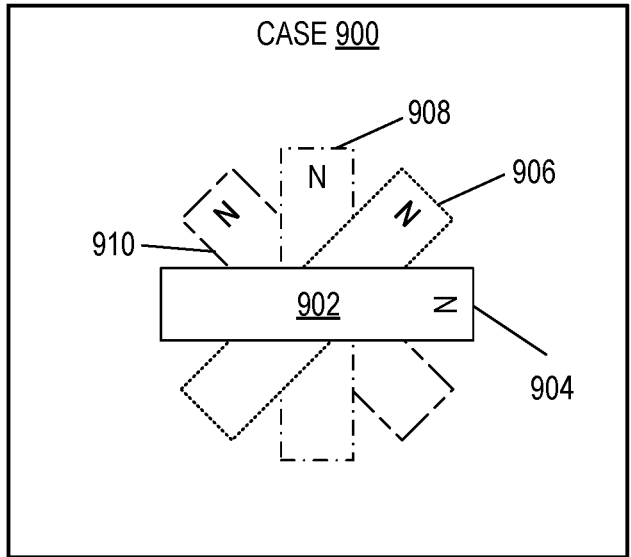
FIG. 9 schematically shows example orientations of a magnet on a case for use as an identity of the case.

As previously mentioned, a case can comprise an identity indicating a model and/or type of the case. FIG. 9 schematically shows an example case 900 comprising a magnet 902. Magnet is placed in a predefined orientation to indicate an identity of case 900. As shown, magnet 902 is placed in a first orientation 904 indicating a first identity. A magnetic sensor on a mobile device is configured to detect the orientation of magnet 902 as discussed in more detail with reference to FIGS. 10 and 11. Alternatively, magnet 902 can be in a second orientation 906 indicating a second identity, a third orientation 908 indicating a third identity, or a fourth orientation 910 indicating a fourth identity. Further orientations also can be used. It will be appreciated that magnet 902 is located on case 900 such that magnet 902 does not interrupt intended functions of components of mobile device when case 900 is attached to the mobile device. Examples of such locations can correspond to a location of a bezel area, a camera area, an aluminum chassis, and other glass and/or low magnetic permeability areas of the mobile device. In some examples, each of the first, second, third, and fourth identities can be associated with a different intended use. Examples of intended use environments include, but are not limited to content-related restrictions, a sports team and/or league, healthcare, and/or gaming. In other examples, another suitable use environment may be used. FIG. 9 is illustrative. In other examples, magnet 902 can have one, two, three, or more than four orientations.

As previously mentioned, a mobile device can utilize a magnetic sensor to detect an orientation of a magnet on a case. FIG. 10 schematically depicts such an example magnetic sensor 1000. Magnetic sensor 1000 is configured to output one or more signals indicative of an orientation of a magnet 1002 relative to magnetic sensor 1000. Magnet 1002 is an example of magnet 902.

Magnetic sensor 1000 comprises a first Hall sensor 1004 configured to output a first signal 1006 indicating a proximity of a pole of magnet 1002 to first Hall sensor 1004. In the depicted example, a proximity of a north pole of magnet 1002 corresponds to a high value of first signal 1006. Further, a proximity of a south pole of magnet 1002 corresponds to a low value of first signal 1006. Similarly, magnetic sensor 1000 further comprises a second Hall sensor 1008 configured to output a second signal 1010, and a third Hall sensor 1012 configured to output a third signal 1014. First Hall sensor 1004, second Hall sensor 1008, and third Hall sensor 1012 are placed in known locations of magnetic sensor 1000. As such, a processor of the mobile device can detect a range of rotation angles 1016 of magnet 1002 based on first signal 1006, second signal 1010, and third signal 1014. In some examples, the processor can comprise one or more general purpose input/outputs (GPIO) to receive first signal 1006, second signal 1010, and third signal 1014. It will be appreciated that a precession of the detected range of rotation angles 1016 of magnet 1002 depends on a number of Hall sensors. In other examples, magnetic sensor 1000 can comprise one, two, or more than three Hall sensors. FIG. 10 is illustrative. In other examples, another suitable magnetic sensor may be used.

Alternatively, a mobile device can utilize an angle sensor to detect an orientation of a magnet on a case. FIG. 11 schematically depicts such an example magnetic sensor 1100 comprising an angle sensor 1102. Magnetic sensor 1100 is configured to output a signal indicative of an orientation of a magnet 1104. Specifically, angle sensor 1102 outputs a sine (sin) signal 1106 and a cosine (cos) signal 1108 indicating a rotation angle 1110 of magnet 1104 relative to angle sensor 1102. As shown, sine signal 1106 and cosine signal 1108 are analog signals. In some examples, an analog-to-digital converter can convert sine and cosine signals 1106, 1108 to digital signals before sending to a processor of the mobile device. Then the processor can detect the orientation (e.g., angle) of magnet 1104 based on the converted digital signals. In some examples, the processor of the mobile device can periodically poll the output of magnetic sensor 1100. In other examples, an interrupt can be used to detect that the case is attached and/or detached. In some such examples, a threshold condition can be used to generate the interrupt. Magnetic sensor 1100 may detect more distinct orientations of a magnet than magnetic sensor 1000 of FIG. 10. Further, magnetic sensor 1100 may be smaller in area, have a faster detection rate, have a higher efficiency, and/or a higher precision control than a Hall sensor. However, magnetic sensor 1100 may be more expensive than magnetic sensor 1000. It will be understood that a selection of magnetic sensor 1100 or magnetic sensor 1000 may be based on a desired cost and/or a desired number of identities. In some examples where there are tens of different identities, the angle sensor may be selected. In other examples, where three or four different identities, one or more Hall sensors may be selected. FIG. 11 is illustrative. In other examples, another suitable magnetic sensor may be used.

FIG. 12 depicts a flow diagram of an example method 1200 for case detection and system reconfiguration. Method 1200 is performed by a mobile device, such as mobile device 300, for example. Method 1200 comprises, at 1202, detecting whether a case is attached. In some examples, a magnetic angle sensor and/or a Hall sensor can be used to detect a magnetic ID (e.g., identity of the case). The case can be case 400, for example. If the case is not detected as attached (e.g., "NO"), then method 1200 moves to 1204, where the mobile device is configured to continue to operate using a first feature set, such as first feature set 500, for example. Alternatively, if the case is detected as attached (e.g., "YES"), method 1200 moves to 1206 and optionally presents a request for one or more user credentials. The one or more user credentials may be a user's credential for an operating system, such as face identification, finger identification, user identification, password, and/or another suitable credential. In such a manner a user of the mobile device can recognize and/or allow changing from the first feature set to a second feature set 1207. Further, a user may not allow a change to second feature set 1207 and continue to operate the mobile device using the first feature set.

At 1208, method 1200 further comprises a credentials granted decision. If the user credentials are not granted (e.g., "NO"), method 1200 moves to 1204 where the mobile device is configured to operate using the first feature set. If the user credentials are granted (e.g., "YES"), then method 1200 moves to 1210 where the mobile device is configured to apply an OS system reconfiguration. Specifically, the mobile device operates using second feature set 1207, where second feature set 1207 is different than the first feature set.

In this example, second feature set 1207 comprises an OS user experience setting 1212. OS user experience setting 1212 can be selected based on an identity of the case. In some examples, OS user experience setting 1212 can include a gaming mode comprising a 120 Hz (Hertz) display refresh rate, higher external temperature threshold, and/or a boosted wireless configuration. In other examples, OS user experience setting 1212 can include a content configuration that implements content-related restrictions, such as parental restrictions for kids. In further examples, OS user experience setting 1212 can include a sports league configuration. The sports league configuration can comprise a 120 Hz display refresh rate, a higher display brightness, and/or a boosted wireless configuration. In yet further examples, OS user experience setting 1212 can include target themes associated with an organization, such as sports teams, universities, schools, clubs, gyms, musical groups, performance groups, or another suitable organization. The target themes can include but are not limited to logos, mascots, colors, sound bites, background images, and/or another OS theme, for example. Second feature set 1207 alternately or additionally can comprise a system thermal reconfiguration 1214 (e.g., a changing of one or more of power/performance/thermal settings), an RF reconfiguration 1216 (e.g., such as those discussed with reference to FIGS. 6, 7, and 8), or a RF power table update 1218.

Returning, method 1200 further comprises, at 1220, detecting when the case is detached. Then method 1200 moves to exit 1222. In exit 1222, the mobile device changes from operating using second feature set 1207 to operating using the first feature set. Further, method 1200 may return to 1202. In other examples, 1220 and/or exit 1222 may be omitted. FIG. 12 is illustrative. In other examples, another flowchart may be used.

FIG. 13 depicts a flow diagram of an example method 1300 for operating a mobile device utilizing a magnetic sensor to detect that a case is attached. Method 1300 may be performed by any suitable mobile device, such as mobile device 300, for example. Method 1300 comprises, at 1302, operating the mobile device with a first feature set. The first feature set comprises one or more features enabled when a case is not attached to the mobile device, such as first feature set 500, for example. The first feature set comprises one or more of a thermal setting, a radio setting, a user interface setting, content-restricted setting, and/or an antenna setting, as indicated at 1304.

Method 1300 comprises, at 1306, detecting that the case is attached to the mobile device and an identity of the case by using a magnetic sensor. At 1308, method 1300 comprises obtaining a second feature set upon detecting that the case is attached and detecting the identity of the case. In some examples, detecting the identity of the case comprises detecting an orientation of a magnet on the case, as indicated at 1310. In such examples, the orientation of the magnet on the case can be detected using a plurality of Hall effect sensors, at 1312, or using an angle sensor, at 1314. The magnetic sensors of FIGS. 10 and 11 may be used to detect the identity of the case.

Continuing, method 1300 comprises, at 1316, operating the mobile device with the second feature set that is different from the first feature set in response to detecting that the case is attached to the mobile device. The second feature set is selected based upon the identity of the case. The second feature set comprises one or more of a thermal setting, a radio setting, a user interface setting, an antenna setting, content-restricted setting, or an executable. The second feature set may comprise second feature set 502 of FIG. 5B, for example. Operating the mobile device with the second feature set can comprise changing a thermal control of the mobile device, as indicated at 1318. Changing the thermal control can include reducing heat produced by the mobile device and/or increasing a thermal transfer of the heat produced out of the mobile device. Alternately or additionally, operating the mobile device with the second feature set can comprise changing a charging rate limit threshold, as indicated at 1320. In some examples, method 1300 further comprises changing the antenna setting such that the radio of the mobile device uses an external antenna at 1322. In other examples, 1322 may be omitted. Method 1300 further comprises, at 1324, operating the mobile device with the first feature set in response to detecting that the case is not attached.

Configuring a mobile device to select a first feature set or a second feature set in response to detecting whether a case is attached to the mobile device can help to adjust an operation of the mobile device to reflect a model and/or type of the case. More generally, the second feature set associated with the case, may help to mitigate physical impacts of the case on operations of the mobile device. Alternatively or additionally, the second feature set may help coordinate operation of the mobile device with a case configured for a desired use environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
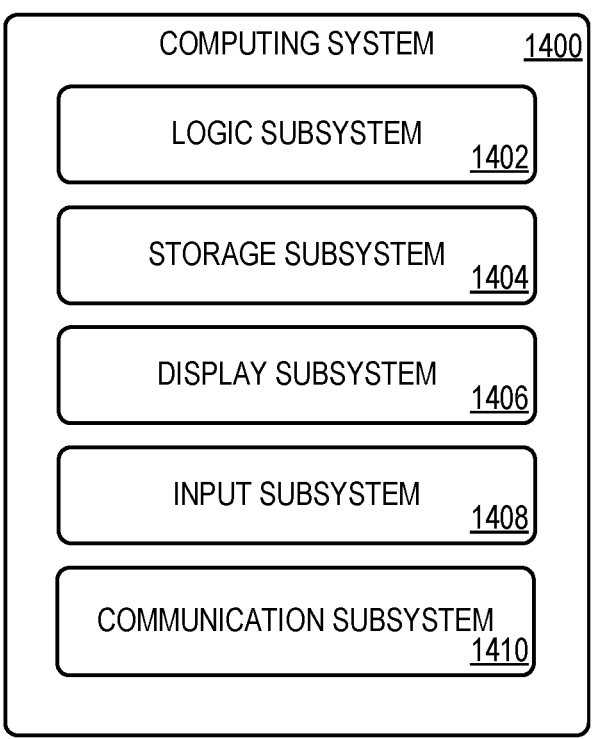
FIG. 14 shows a block diagram of an example computing system.

FIG. 14 schematically shows a non-limiting embodiment of a Computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices. Mobile device 300 is an example of computing system 1400.

Computing system 1400 includes a logic subsystem 1402 and a storage subsystem 1404. Computing system 1400 may optionally include a display subsystem 1406, input subsystem 1408, communication subsystem 1410, and/or other components not shown in FIG. 14.

Logic subsystem 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 1404 includes one or more physical devices configured to hold instructions executable by the logic machine to implement the methods and processes described herein. When such methods and processes are implemented, the state of storage subsystem 1404 may be transformed—e.g., to hold different data.

Storage subsystem 1404 may include removable and/or built-in devices. Storage subsystem 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1404 may include volatile, nonvolatile, dynamic, static, read/write, read-only, random-access, sequential-access, location-addressable, file-addressable, and/or content-addressable devices.

It will be appreciated that storage subsystem 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1402 and storage subsystem 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1406 may be used to present a visual representation of data held by storage subsystem 1404. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic subsystem 1402 and/or storage subsystem 1404 in a shared enclosure, or such display devices may be peripheral display devices.

When included, input subsystem 1408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1410 may be configured to communicatively couple Computing system 1400 with one or more other computing devices. Communication subsystem 1410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 1400 to send and/or receive messages to and/or from other devices via a network such as the Internet.

Another example provides a method enacted on a mobile device. The method comprises operating the mobile device with a first feature set, the first feature set comprising one or more features enabled when a case is not attached to the mobile device, detecting that the case is attached to the mobile device and an identity of the case by using a magnetic sensor, and operating the mobile device with a second feature set that is different from the first feature set in response to detecting that the case is attached to the mobile device, the second feature set selected based upon the identity of the case. In some such examples, the method alternatively or additionally comprises operating the mobile device with the first feature set in response to detecting that the case is not attached. In some such examples, the method alternatively or additionally comprises obtaining the second feature set upon detecting that the case is attached and detecting the identity of the case. In some such examples, detecting the identity of the case alternatively or additionally comprises detecting an orientation of a magnet on the case. In some such examples, detecting the orientation of the magnet on the case alternatively or additionally comprises detecting the orientation using an angle sensor. In some such examples, detecting the orientation of the magnet on the case alternatively or additionally comprises detecting the orientation using a plurality of Hall effect sensors. In some such examples, operating the mobile device with the second feature set alternatively or additionally comprises changing a thermal control of the mobile device. In some such examples, operating the mobile device with the second feature set alternatively or additionally comprises changing a charging rate limit threshold.

Another example provides a mobile device comprising a magnetic sensor configured to output a signal indicative that a case is attached to the mobile device, a logic device, and a storage device comprising instructions operable by the logic device to implement a first feature set on the mobile device, detect that the case is attached to the mobile device and also an identity of the case using the magnetic sensor, and change from the first feature set to a second feature set in response to detecting that the case is attached. In some such examples, the instructions are alternatively or additionally operable to change the second feature set to the first feature in response to detecting that the case is not attached. In some such examples, the magnetic sensor alternatively or additionally comprises a plurality of Hall sensors and the instructions are alternatively or additionally executable to detect an orientation of a magnet on the case, detect the identity of the case based on the orientation of the magnet using the plurality of Hall sensors, and select the second feature set based on the identity of the case. In some such examples, the magnetic sensor alternatively or additionally comprises an angle sensor and the instructions are alternatively or additionally executable to detect an orientation of a magnet on the case, detect the identity of the case based on the orientation of the magnet using the angle sensor, and select the second feature set based on the identity of the case. In some such examples, the mobile device alternatively or additionally comprises a radio, and the instructions operable to change the first feature set to the second feature set alternatively or additionally comprise instructions operable to change an antenna setting such that the radio uses an external antenna on the case. In some such examples, the instructions operable to change from the first feature set to the second feature set in response to detecting that the case is attached alternatively or additionally comprise instructions operable to change a thermal control of the mobile device. In some such examples, the instructions operable to change from the first feature set to the second feature set in response to detecting that the case is attached alternatively or additionally comprise instructions operable to change a charging rate limit threshold.

Another example provides, a mobile device comprising a magnetic sensor configured to output a signal indicative that a case is attached to the mobile device, a logic device, and a storage device comprising instructions operable by the logic device to implement a first feature set on the mobile device, detect that the case is attached to the mobile device and detect an identity of case using the magnetic sensor, and change from the first feature set comprising a first thermal setting to a second feature set comprising a second thermal setting in response to detecting that the case is attached, the second feature set selected based upon the identity of the case. In some such examples, the instructions are alternatively or additionally operable to change the second feature set to the first feature in response to detecting that the case is not attached. In some such examples, the sensor alternatively or additionally comprises an angle sensor. In some such examples, the sensor alternatively or additionally comprises a plurality of Hall effect sensors. In some such examples, one or more of the first thermal setting or the second thermal setting each alternatively or additionally comprises a thermal threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. Enacted on a mobile device, a method comprising:
operating the mobile device with a first feature set, the first feature set comprising at least one first RF setting enabled when a case is not attached to the mobile device;
detecting that the case is attached to the mobile device and an identity of the case by using a magnetic sensor; and
operating the mobile device with a second feature set that is different from the first feature set in response to detecting that the case is attached to the mobile device, the second feature set comprising at least one second RF setting that is selected based upon the identity of the case.

2. The method of claim 1, further comprising operating the mobile device with the first feature set in response to detecting that the case is not attached.

3. The method of claim 1, further comprising obtaining the second feature set upon detecting that the case is attached and detecting the identity of the case.

4. The method of claim 1, wherein detecting the identity of the case comprises detecting an orientation of a magnet on the case.

5. The method of claim 4, wherein detecting the orientation of the magnet on the case comprises detecting the orientation using an angle sensor.

6. The method of claim 4, wherein detecting the orientation of the magnet on the case comprises detecting the orientation using a plurality of Hall effect sensors.

7. The method of claim 1, wherein operating the mobile device with the second feature set comprises changing a thermal control of the mobile device.

8. The method of claim 1, wherein operating the mobile device with the second feature set comprises changing a charging rate limit threshold.

9. A mobile device, comprising:
a magnetic sensor configured to output a signal indicative that a case is attached to the mobile device;
an internal antenna;
a connector configured to connect to an external antenna on the case;
a radio circuit;
a logic device; and
a storage device comprising instructions operable by the logic device to
implement a first feature set on the mobile device, the first feature set comprising at least a first RF antenna setting where the radio circuit uses the internal antenna,
detect that the case is attached to the mobile device and also an identity of the case using the magnetic sensor, and
change from the first feature set to a second feature set in response to detecting that the case is attached, the second feature set comprising a second RF antenna setting where the radio circuit uses the external antenna.

10. The mobile device of claim 9, wherein the instructions are further operable to change the second feature set to the first feature in response to detecting that the case is not attached.

11. The mobile device of claim 9, wherein the magnetic sensor comprises a plurality of Hall sensors and the instructions are further executable to
detect an orientation of a magnet on the case,
detect the identity of the case based on the orientation of the magnet using the plurality of Hall sensors, and
select the second feature set based on the identity of the case.

12. The mobile device of claim 9, wherein the magnetic sensor comprises an angle sensor and the instructions are further executable to
detect an orientation of a magnet on the case,
detect the identity of the case based on the orientation of the magnet using the angle sensor, and
select the second feature set based on the identity of the case.

13. The mobile device of claim 9, wherein the instructions operable to change from the first feature set to the second feature set in response to detecting that the case is attached comprise instructions operable to change a control of the mobile device.

14. The mobile device of claim 9, wherein the instructions operable to change from the first feature set to the second feature set in response to detecting that the case is attached comprise instructions operable to change a charging rate limit threshold.

15. The mobile device of claim 9, wherein the second feature set further comprises an RF power setting, and the instructions operable to change from the first feature set to the second feature set in response to detecting that the case is attached comprise instructions operable to change a transmit power of the internal antenna.

16. A mobile device, comprising:
a magnetic sensor configured to output a signal indicative that a case is attached to the mobile device;
a logic device; and
a storage device comprising instructions operable by the logic device to
implement a first feature set on the mobile device,
detect that the case is attached to the mobile device and detect an identity of case using the magnetic sensor, and
change from the first feature set comprising a first RF setting to a second feature set comprising a second RF setting in response to detecting that the case is attached, the second feature set selected based upon the identity of the case.

17. The mobile device of claim 16, wherein the instructions are further operable to change the second feature set to the first feature in response to detecting that the case is not attached.

18. The mobile device of claim 16, wherein the sensor comprises an angle sensor.

19. The mobile device of claim 16, wherein the sensor comprises a plurality of Hall effect sensors.

20. The mobile device of claim 16, wherein the second RF setting comprises one or more of an RF power setting or an RF antenna setting.

* * * * *